US012098048B2

(12) United States Patent
Jones

(10) Patent No.: US 12,098,048 B2
(45) Date of Patent: Sep. 24, 2024

(54) WRAPPING PAPER STORAGE AND DISPENSING DEVICE

(71) Applicant: George Jones, Lake Worth, FL (US)

(72) Inventor: George Jones, Lake Worth, FL (US)

( * ) Notice: Subject to any disclaimer, the term of this patent is extended or adjusted under 35 U.S.C. 154(b) by 158 days.

(21) Appl. No.: 17/650,080

(22) Filed: Feb. 5, 2022

(65) Prior Publication Data

US 2022/0250866 A1 Aug. 11, 2022

Related U.S. Application Data

(60) Provisional application No. 63/146,226, filed on Feb. 5, 2021.

(51) Int. Cl.

| | |
|---|---|
| ***B65H 35/00*** | (2006.01) |
| ***B26D 1/04*** | (2006.01) |
| ***B26D 1/18*** | (2006.01) |
| ***B65H 16/00*** | (2006.01) |
| ***B65H 16/02*** | (2006.01) |

(52) U.S. Cl.
CPC ........... *B65H 35/0086* (2013.01); *B26D 1/04* (2013.01); *B26D 1/045* (2013.01); *B26D 1/185* (2013.01); *B65H 16/005* (2013.01); *B65H 16/021* (2013.01); *B65H 2301/51512* (2013.01); *B65H 2701/1944* (2013.01)

(58) Field of Classification Search
CPC .............. B65H 35/0073; B65H 35/008; B65H 35/0086
USPC ..................................................... 83/613–614
See application file for complete search history.

(56) References Cited

U.S. PATENT DOCUMENTS 1,107,747 A * 8/1914 Bauer ................ B65D 83/0805 242/588.3
2,031,033 A * 2/1936 Wise .................... B65D 85/672 225/53
4,108,390 A * 8/1978 Hayes .................... B65H 16/02 242/615.3
4,369,929 A * 1/1983 Cayer ................ B65H 35/0006 242/594.6
4,671,409 A * 6/1987 Espy .................... B65D 85/672 53/409
5,011,059 A * 4/1991 Jennings, Jr. ...... B65H 35/0006 83/650

(Continued)

FOREIGN PATENT DOCUMENTS

EP 3653518 A1 * 5/2020 ............. B65B 19/20

*Primary Examiner* — Adam J Eiseman
*Assistant Examiner* — Richard D Crosby, Jr.
(74) *Attorney, Agent, or Firm* — Allen F. Bennett; Bennett Intellectual Property

(57) ABSTRACT

A housing contains a rotating drum formed by a plurality of tubular canisters. The cannisters hold rolls of paper. A fixed longitudinal cutting base and a corresponding blade track supported by two pivoting arms are positioned on one side of the housing. A blade carriage slidingly engages the longitudinal blade track with a sliding ratcheting lock mechanism. The ratcheting lock is connected to a blade in the blade carriage which locks in place when the blade is extended through a slit in the blade track. The canisters are formed by cylindrical tubes having a rectangular openings extending along their longitudinal lengths, stationary first end caps, sliding second end caps, and sliding tensioners engaged to the canister between the first end cap and the second end cap.

9 Claims, 13 Drawing Sheets

(56) References Cited

U.S. PATENT DOCUMENTS 5,022,577 A * 6/1991 Fike ..................... B65H 49/205 225/46
5,082,159 A * 1/1992 Gutierrez ............. B65H 35/002 225/34
5,277,351 A * 1/1994 McCullagh ........ B65H 35/0006 225/38
5,305,937 A * 4/1994 Barnett ................ B65H 35/002 242/594.6
5,593,035 A * 1/1997 Taylor .................. B65H 16/005 206/397
5,630,563 A * 5/1997 Meisner ............... B65H 35/002 242/598.6
5,718,365 A * 2/1998 Palmer ................... A61C 7/306 225/38
5,954,256 A * 9/1999 Niada ................ A47K 10/3836 242/598.6
5,957,358 A * 9/1999 Getz .................. B65H 35/0006 206/820
6,123,197 A * 9/2000 Marquez ................. A47F 13/00 206/575
6,616,087 B1 * 9/2003 Chern ................ B65H 35/0026 242/559.2
6,729,512 B1 * 5/2004 Leighton .............. B65H 35/002 242/598.5
6,913,178 B2 * 7/2005 Huang ............... B65H 35/0026 225/24
7,111,727 B2 * 9/2006 Small ...................... B65B 67/08 206/394
7,134,583 B2 * 11/2006 May ................... B65H 35/0006 225/34
7,347,132 B2 * 3/2008 Schultz ................ B23D 35/008 83/485
7,424,843 B2 7/2008 Guillory
7,614,331 B2 * 11/2009 Schaefer ................... A47F 7/17 242/594
7,694,617 B2 * 4/2010 Habra .................... B26D 1/065 83/578
7,987,758 B2 * 8/2011 Chabansky ........ B65H 35/0086 83/697
8,113,400 B1 * 2/2012 Santolalla .......... B65H 35/0006 225/6
8,967,440 B2 * 3/2015 Chang .................. B65H 35/002 225/2
10,330,449 B2 * 6/2019 Fix .......................... F42B 12/70
11,407,580 B2 * 8/2022 Vegliante ............... B65H 35/06
2003/0230665 A1 12/2003 Small
2004/0084496 A1 * 5/2004 Yu Chen ............ B65H 35/0026 225/25
2004/0182905 A1 * 9/2004 Gomes ............... B65H 35/0026 225/34
2005/0034584 A1 2/2005 Antal et al.
2005/0072826 A1 4/2005 Sewell et al.
2005/0127083 A1 6/2005 Russell
2005/0150924 A1 7/2005 May et al.
2006/0021485 A1 2/2006 Richards
2007/0000935 A1 1/2007 Pavlik et al.
2007/0051770 A1 3/2007 Berg
2007/0173394 A1 * 7/2007 Lee ........................ B26D 1/045 83/614
2009/0188366 A1 * 7/2009 Habra .................. B26D 7/2614 83/649
2009/0211420 A1 * 8/2009 Loibl ..................... B26D 1/185 83/485
2010/0072243 A1 3/2010 Pelton et al.
2014/0096659 A1 * 4/2014 Choi .................... B65H 35/002 83/485
2016/0090264 A1 * 3/2016 Yu Chen .............. B65H 35/004 225/34

* cited by examiner

Fig. 11
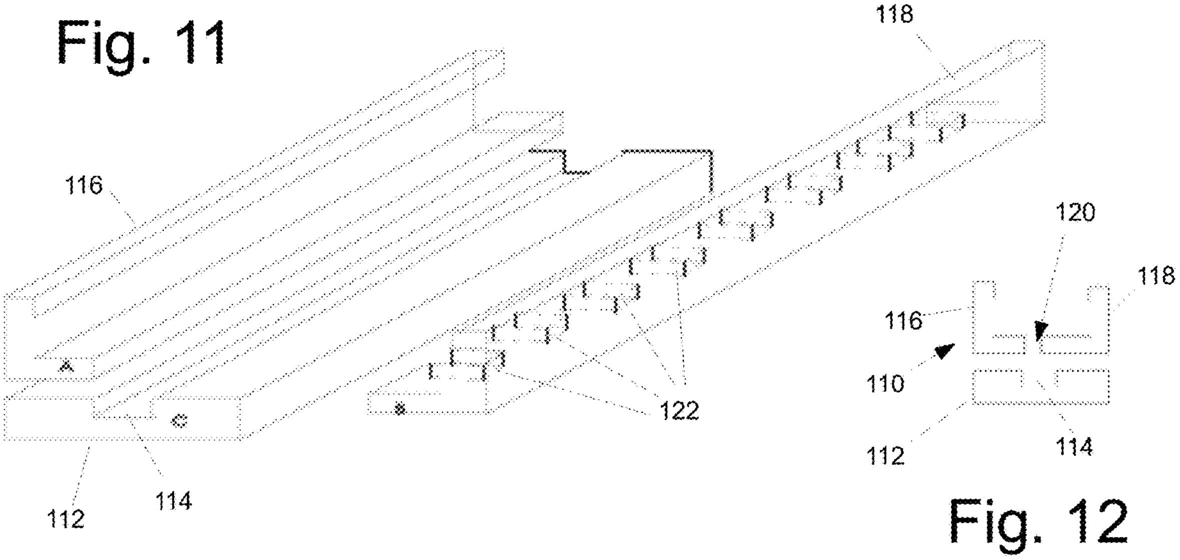
Fig. 12
Fig. 13
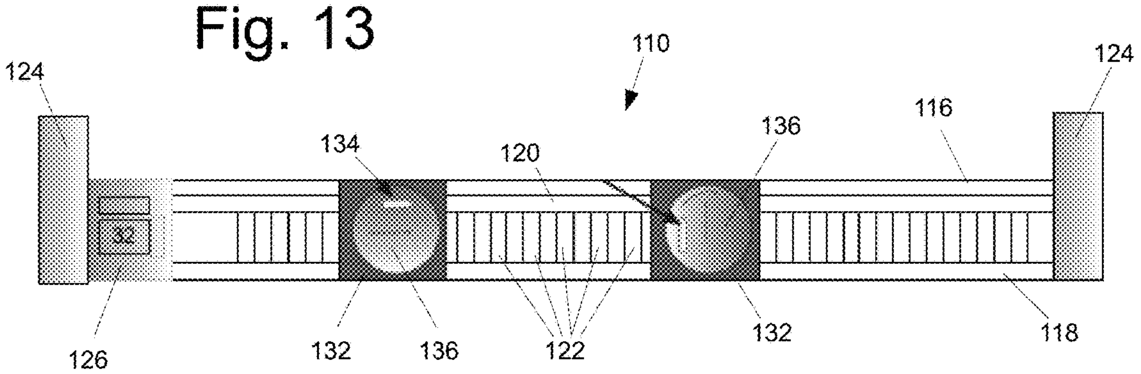
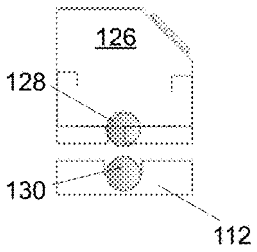
Fig. 14
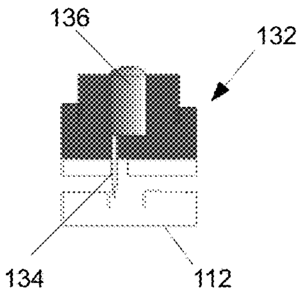
Fig. 15
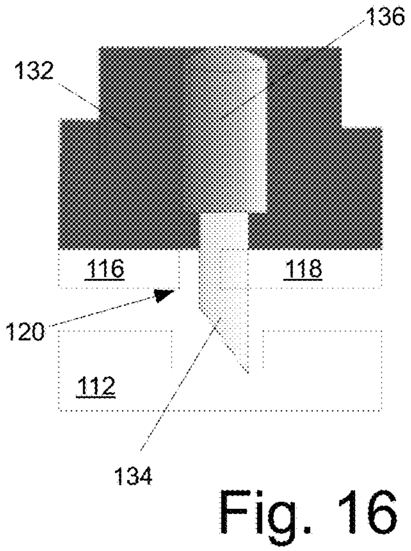
Fig. 16

Fig. 17
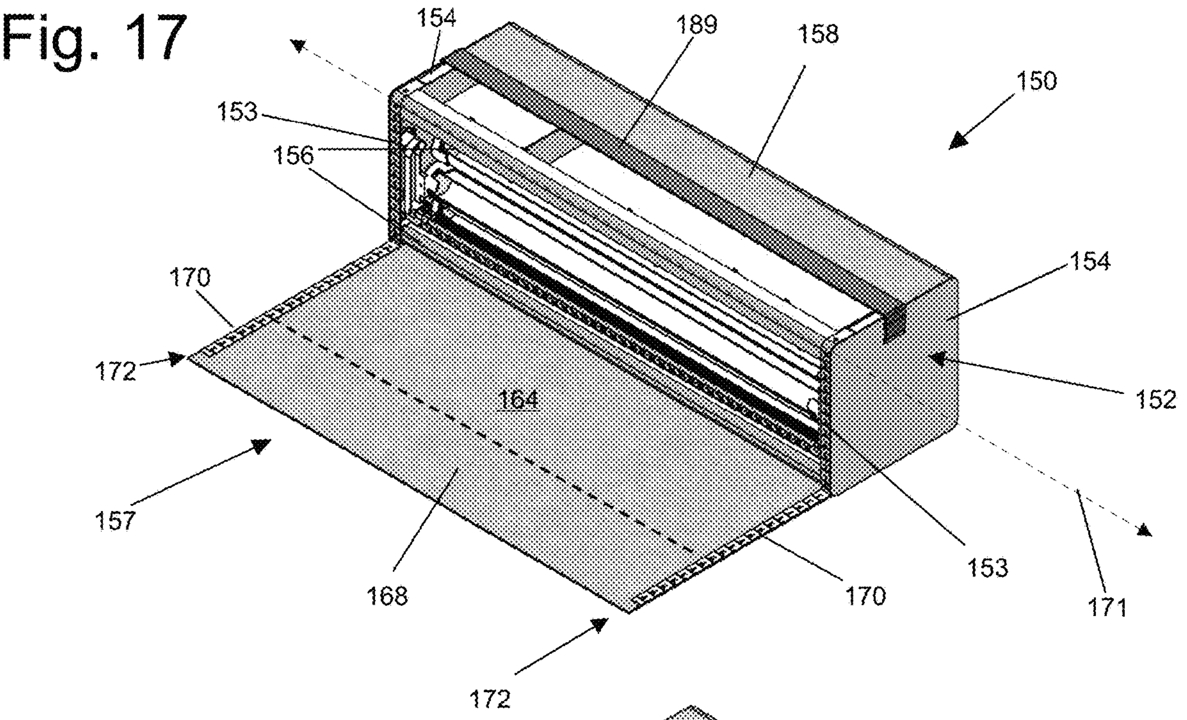
Fig. 18
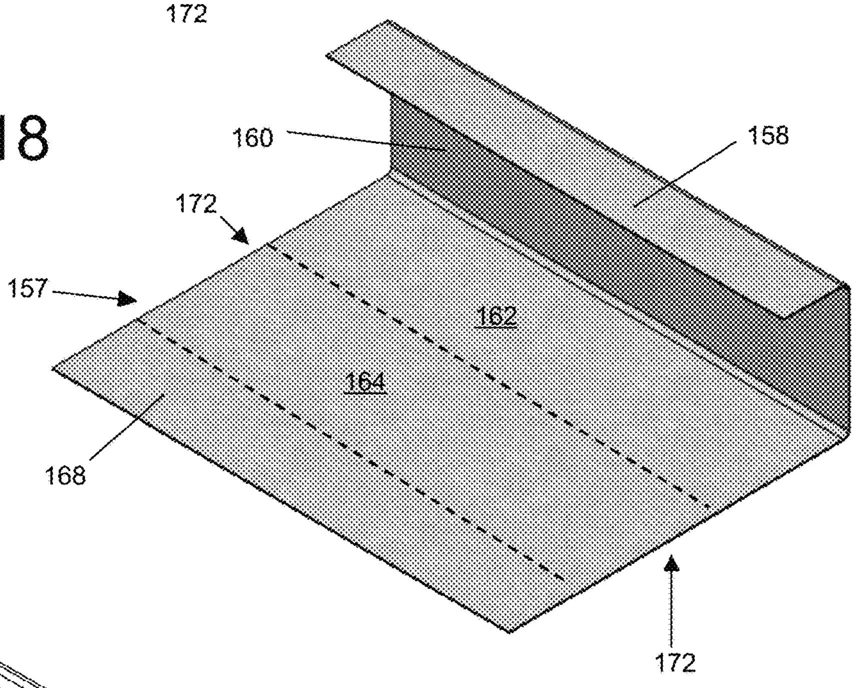
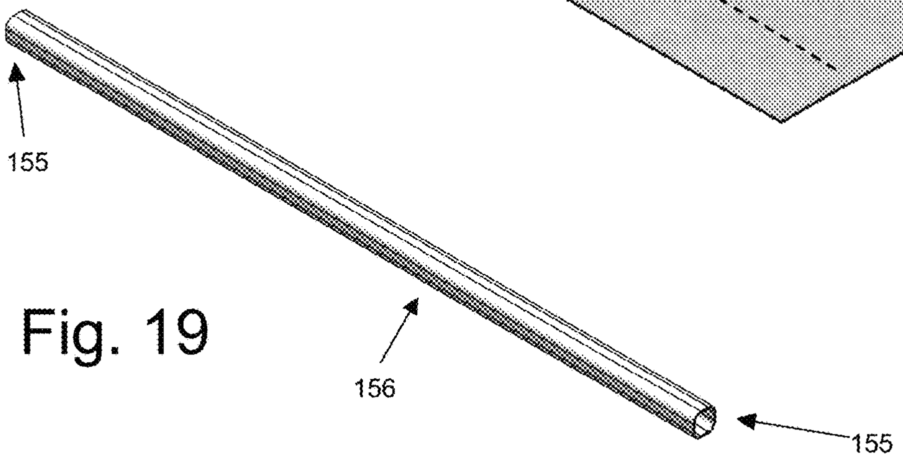
Fig. 19

Fig. 20
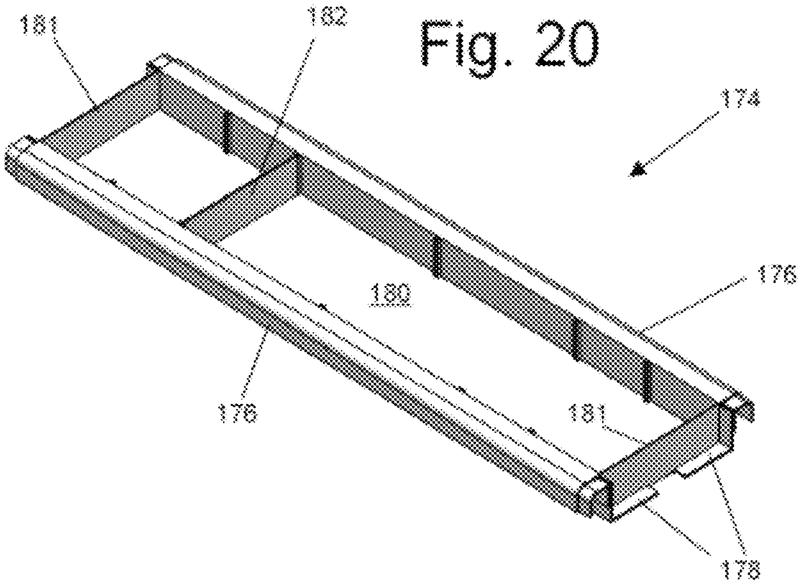
Fig. 21
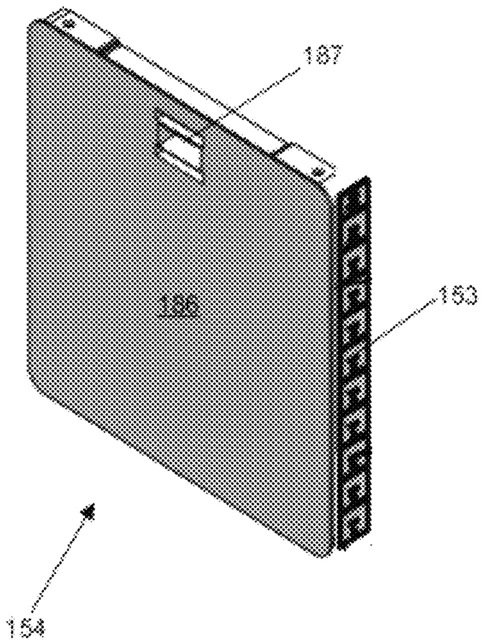
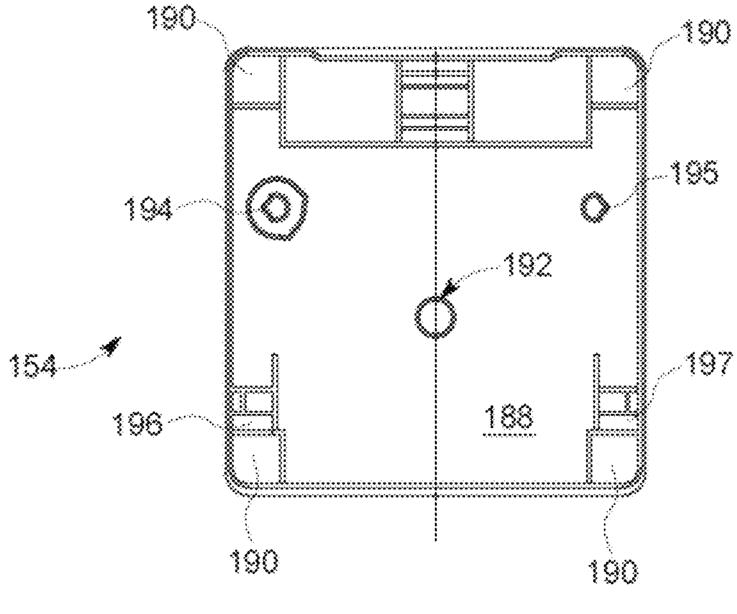
FIG. 22

Fig. 33
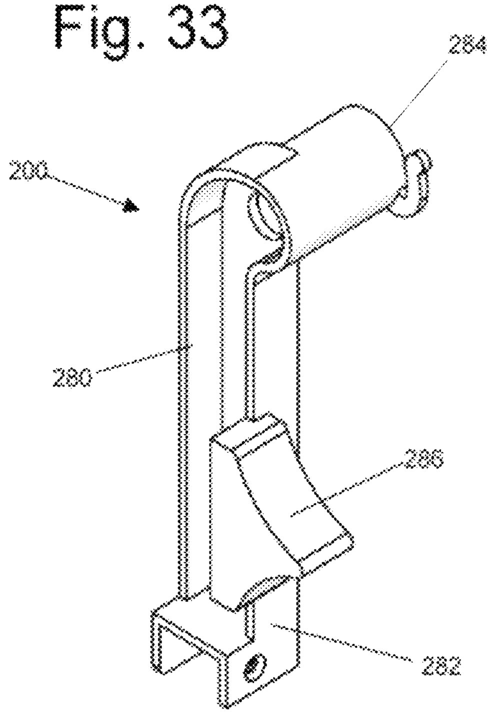
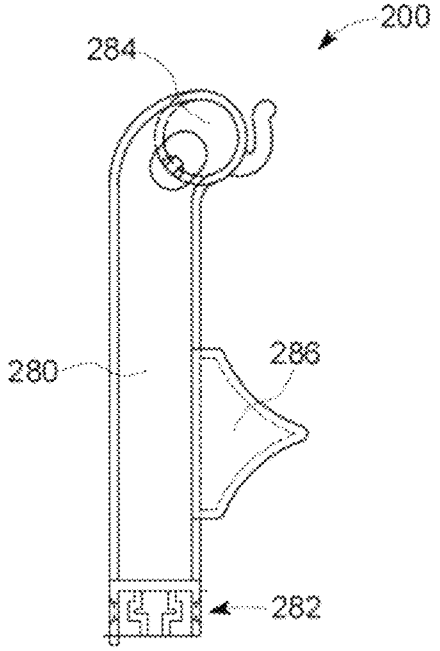
FIG. 34
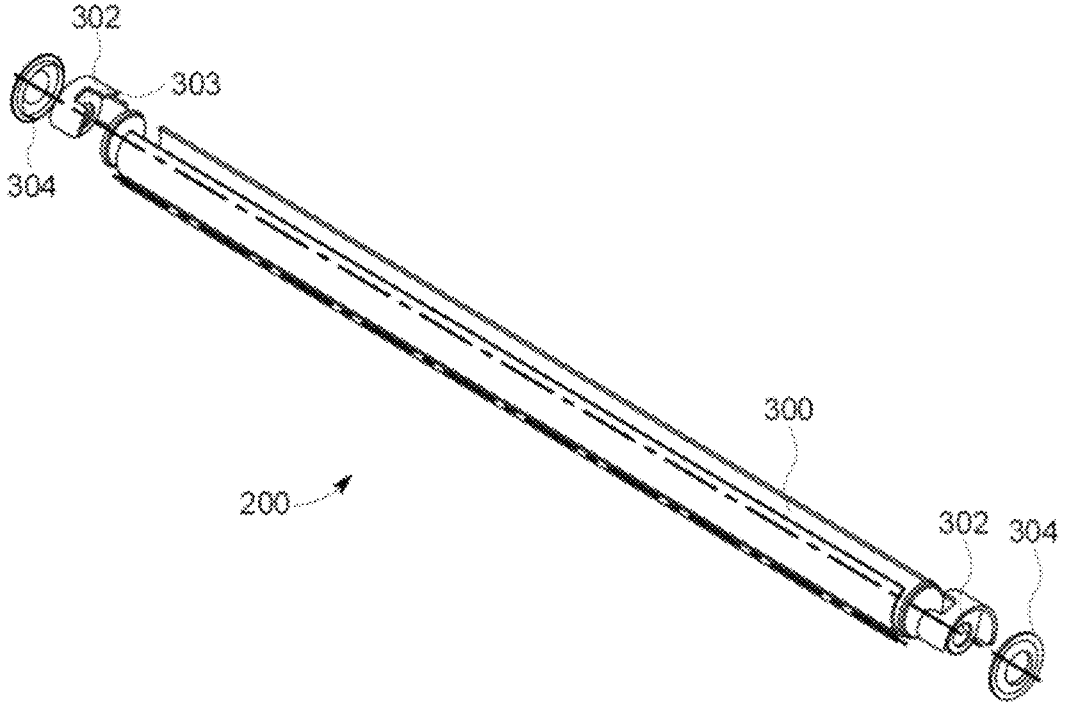
FIG. 35

WRAPPING PAPER STORAGE AND DISPENSING DEVICE

CROSS-REFERENCE TO RELATED APPLICATIONS

This application claims priority to U.S. Provisional Application Ser. No. 63/146,226 filed on Feb. 5, 2021.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a device for storing and dispensing wrapping paper. More particularly, the invention relates to devices for safely and securely storing paper and accurately measuring and cutting rolled paper or other web material as it is dispensed.

Description of the Related Art

It has long been customary to cover or wrap gifts in an aesthetically pleasing decorative material prior to presenting them to a recipient. This conceals the nature of the gift and enhances the gift giving experience. One of the most common methods for gift wrapping is to use sheets of paper, commonly supplied in cylindrical rolls, which are folded around an object and taped. When many guests are presented, for example at events such as Christmas, Hanukkah or the like, it is desirable to use many different types of gift wrapping paper having different patterns. As a result, it is common for people to possess several different rolls of gift wrapping paper, which are only used a few times a year. These rolls of giftwrapping paper are easily bent or creased if stored improperly. Rolls of wrapping paper are typically too large to be simply stored in a drawer or other small compartments. In addition, giftwrapping paper commonly comes in rolls of different lengths. As a result, several rolls of giftwrapping paper are often stored in closets or other spaces where they are likely to be bent, creased or otherwise damaged.

In addition to the difficulties in storing giftwrapping paper, they are often also difficult to accurately measure when wrapping a gift. Because they are supplied in rolls, the paper curls as it is unrolled. Furthermore, the paper used for giftwrapping is prone to tearing. Not only does the giftwrapping paper tear, it quite often forms several small tears transverse to the direction in which it is being cut. These problems and more make giftwrapping an unpleasant experience for some and an acquired art for others.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description. In view of the foregoing, it is desirable to provide a device capable of storing as well as accurately cutting giftwrapping paper or other materials provided on a web.

BRIEF SUMMARY OF THE INVENTION

Disclosed is a device for both storing and dispensing wrapping paper. Rolls of wrapping paper are housed within separate tubular canisters that are coextensively aligned in parallel to a longitudinal axis to form a cylindrical rotating drum. The drum is housed within a housing, or casing. One side of the housing folds down to expose the tubular canisters. One end of each canister has an adjustable end cap that may be positioned to accommodate rolls of varying lengths. To dispense giftwrapping paper, the selected paper is pulled out of its respective canister between an elongate longitudinal cutting base and a rotating longitudinal arm that has graduated blade track. A blade carriage, preferably employing a ratcheting lock mechanism, may slide down the longitudinal length of the blade track and be secured in a desired location. The blade track is then placed flush against the cutting base, sandwiching the giftwrapping paper between them. As the paper is pulled from the roll, the blade in the blade carriage cuts the paper in a transverse direction without creating tears. The folded down side of the housing may also include measurements along one edge and a channel that can be aligned with a slidable serrated circular blade may be used for making longitudinal cuts through the paper. The blade track or the cutting base may include a counting mechanism, such as a measuring wheel.

In one embodiment, a wrapping paper storage and dispensing device comprises a storage housing, optionally including a folding first side having a transverse ruler along a first edge. A rotating drum is housed within the storage housing and rotates along a longitudinal axis. A plurality of canisters are arranged on a periphery the drum, and are optionally arranged coextensively and in parallel along a longitudinal direction. The invention also includes a fixed longitudinal cutting base and a pivoting arm having a longitudinal blade track, which may optionally be graduated. The blade track also optionally includes a measuring wheel. A blade carriage slidingly engages the longitudinal blade track, optionally having a ratcheting lock. The ratcheting lock mechanism is provided by a retractable blade in the blade carriage which locks in place when the blade is extended through a slit in the blade track and optionally extends into a slit in the cutting base. The canisters are formed by a cylindrical tube having a longitudinal length and a rectangular opening extending along the longitudinal length, a stationary first end cap on a first end, a sliding second end cap, and a sliding tensioner slidably engaged to the canister between the first end cap and the second end cap. The first end cap and/or the second end cap optionally includes a transverse pad which abuts the end of a roll of wrapping paper inserted into the canister.

It is therefore an object of the present invention to provide a device for securely storing and dispensing a plurality of giftwrapping paper rolls. The invention may also be used for other types of paper and/or materials provided as cylindrical rolls. The invention also allows an operator to accurately and precisely cut gift wrapping paper to desired dimensions.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 11 is a perspective and cross-sectional view of an alternative embodiment of a blade track and cutting base for a wrapping paper storage and dispensing device in accordance with principles of the invention;

FIG. 12 is a cross-sectional view of an alternative embodiment of a blade track and cutting base for a wrapping paper storage and dispensing device in accordance with principles of the invention;

FIG. 13 is a top plan view of an alternative embodiment of a blade track and cutting base for a wrapping paper storage and dispensing device accordance with principles of the invention;

FIG. 14 is a cross-sectional view of a counter for a wrapping paper storage and dispensing device in accordance principles of the invention;

FIG. 15 is a cross-sectional view of a blade carriage for a wrapping paper storage and dispensing device in accordance with principles of the invention;

FIG. 16 is another cross-sectional view of a blade carriage for a wrapping paper storage and dispensing device in accordance with principles of the invention;

FIG. 17 is a perspective view of an alternative embodiment of a wrapping paper storage and dispensing device in accordance with principles of the invention;

FIG. 18 is a perspective view of a web of material for a housing for a wrapping paper storage and dispensing device in accordance with principles of the invention;

FIG. 19 is a perspective view of a longitudinal beam for a housing for a wrapping paper storage and dispensing device in accordance with principles of the invention;

FIG. 20 is a perspective view of a top of a housing for a wrapping paper storage and dispensing device in accordance with principles of the invention;

FIG. 21 is a perspective view of a lateral end of a housing for a wrapping paper storage and dispensing device in accordance with principles of the invention;

FIG. 22 is a side elevation view of a lateral end of the housing for a wrapping paper storage and dispensing device in accordance with principles of the invention;

FIG. 33 is a perspective view of a pivoting support arm for a wrapping paper storage and dispensing device in accordance with principles of the invention;

FIG. 34 is a side elevation view of a pivoting support arm for a wrapping paper storage and dispensing device in accordance with principles of the invention;

FIG. 35 is an exploded view of a canister for a wrapping paper storage and dispensing device in accordance with principles of the invention;

DETAILED DESCRIPTION

Figure 1:
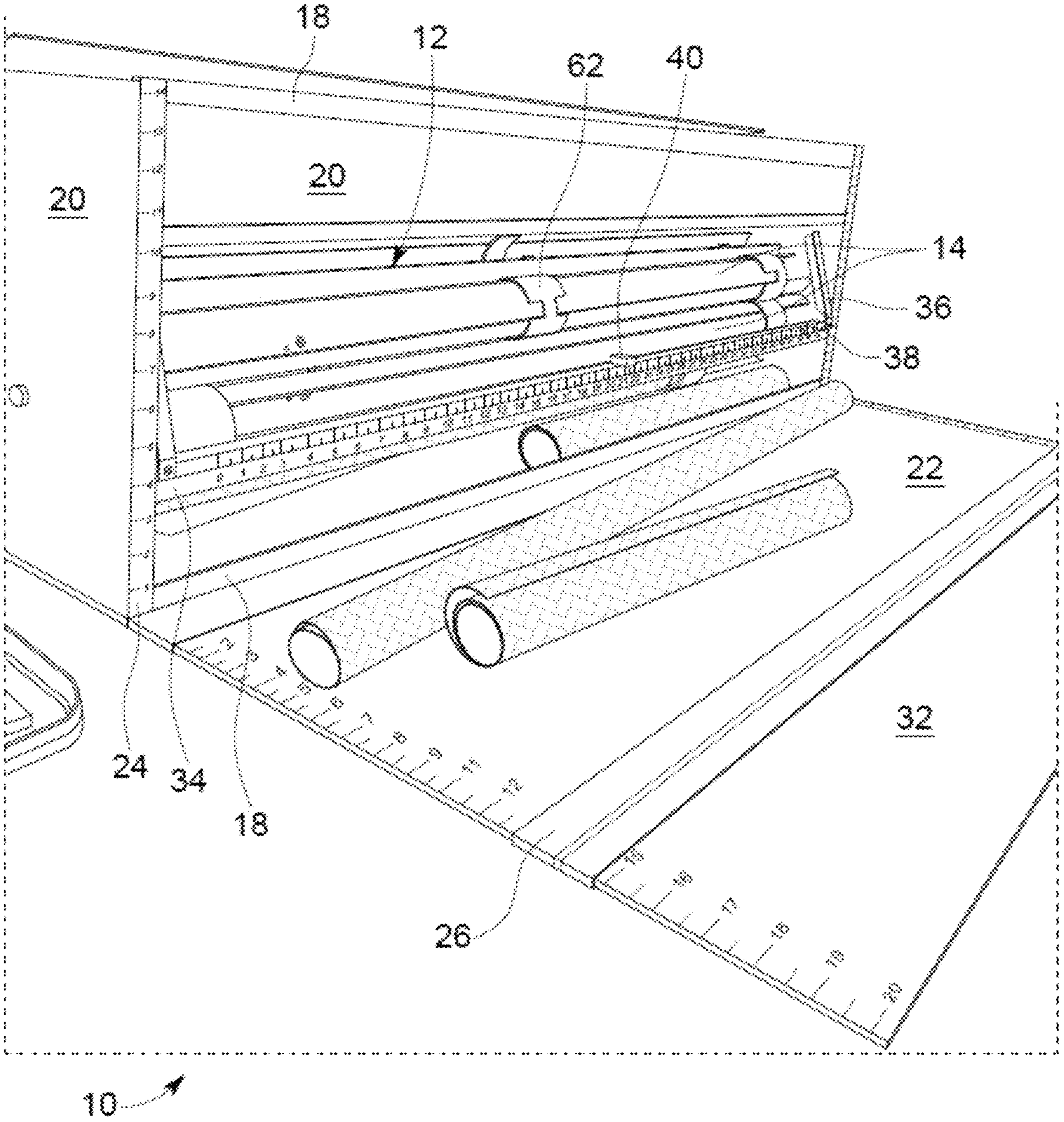
FIG. 1 is a perspective view of a wrapping paper storage and dispensing device in accordance with the principles of the invention.
Figure 2:
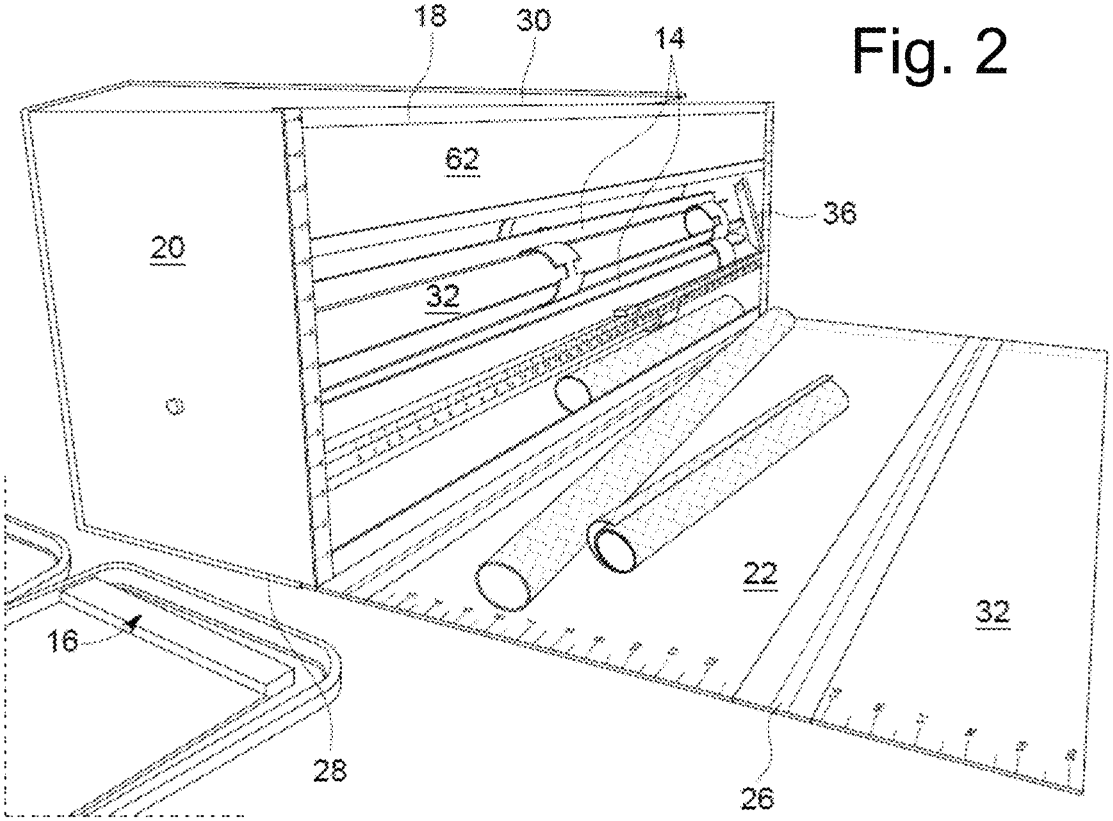
FIG. 2 is another perspective view of a wrapping paper storage and dispensing device in accordance with principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise. "Longitudinal" is used to refer to the direction parallel to the tubular canisters. "Transverse" is used to refer to the direction perpendicular to the longitudinal direction.

Disclosed is a device for both storing and dispensing wrapping paper. Rolls of wrapping paper are housed within separate tubular canisters that are coextensively aligned parallel to a longitudinal axis, thereby forming a cylindrical rotating drum. The drum is housed within a casing, generally referred to herein as a box, casing or housing. One side, or part of one side, of the housing folds down to expose the tubular canisters. One end of each canister has an adjustable end cap that may be positioned to accommodate rolls of varying lengths. To dispense giftwrapping paper, the selected paper is pulled out of its respective canister an cut in a longitudinal direction using a slide cutter. In some embodiments, the slide cutter is formed by an elongate longitudinal cutting base and a graduated cutting track which may rotate away from or align flush against the top of the cutting base. A blade carriage, which may include a ratcheting lock mechanism, slides along the longitudinal length of the blade track and can be secured in a desired location. When the blade track is placed flush against the top of the cutting base, the gift wrapping paper is sandwiched between them. The sliding blade can be aligned in a transverse direction such that as the paper is pulled from the roll, the blade of the blade carriage cuts the paper in a transverse direction without creating tears. Once a desired length of wrapping paper is extracted, the blade may be rotated 90 degrees and used to cut longitudinally to separate the selected paper from the roll in the cannister. Because the region of the paper being cut is sandwiched between the planar top of the cutting base and the planar bottom of the track, minor tears are prevented and the cut is smooth and straight.

The folded down side of the case may also optionally include measurements along one edge and a channel that can be aligned with a slidable serrated circular blade may be used for making longitudinal cuts through the paper. The blade track or the cutting base may include a counting mechanism, such as a measuring wheel.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure. Additionally, the preferred embodiments disclosed herein generally refer to giftwrapping paper. However, a person of ordinary skill in the art will readily recognize that the invention may be suitable for use with a variety of materials commonly supplied as a roll. Numerous materials are manufactured and processed as webs similar to giftwrapping paper. It is expressly contemplated that the invention may be used with any suitable flexible sheet material commonly referred to as a web in the manufacturing industry.

FIGS. 1-8 show a gift wrapping paper storage and dispensing device 10 in accordance with the principles of the invention. The device 10 of this embodiment has a drum 12 formed by several tubular canisters 14 in a cylindrical configuration. The drum 12 is encased within a housing 16 having a polyhedral prism shape. In this embodiment, the housing 16 is a rectanguloid. The housing 16 may optionally have any polyhedral configuration such as a hexagonal or octagonal prism, a parallelepiped shape or the like. The housing 16 serves as a casing and/or a housing to protect the canisters 14 and their contents, as well as the mechanisms that allow the drum 12 to rotate about a longitudinal axis. In this embodiment, the housing 16 is formed from a rigid frame 18 (made from metal, hard plastic or the like) and a plurality of panels 20, including the front panel 22. The front panel 22 has a primary hinge 24 extending along the bottom front longitudinal corner 23 of the frame 18 and a secondary hinge 26. The distance between the primary hinge 24 and the secondary hinge 26 is slightly greater than the distance between the bottom 28 and the top 30 of the housing 16. The secondary hinge 26 pivotally connects the front panel 22 to a distal secondary panel 32. Optionally, the housing 16 may not include a secondary hinge 26 and the secondary panel 32. The front panel 22 may be graduated along one edge to allow measurement of paper dispensed from the device 10.

The device 10 also includes a fixed longitudinal cutting base 34 and pivoting arms 36. The pivoting arms 36 support a longitudinal blade track 38 and a blade carriage 40 slidingly engaged to the blade track 38.

Figure 3:
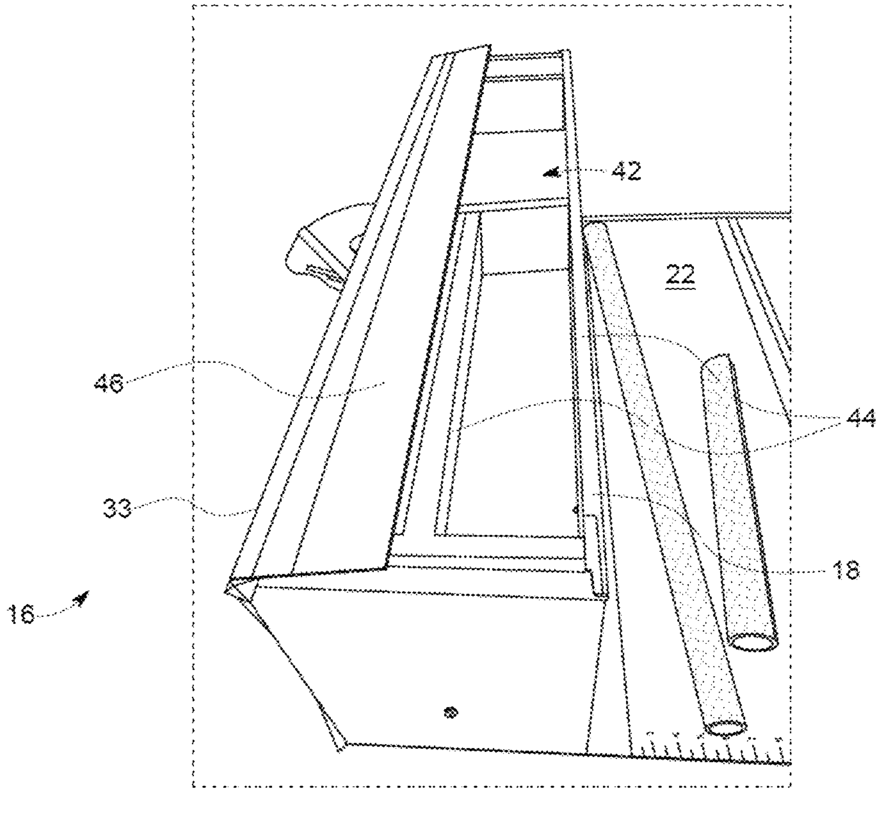
FIG. 3 is a top perspective view of a wrapping paper storage and dispensing device in accordance with principles of the invention.
Figure 4:
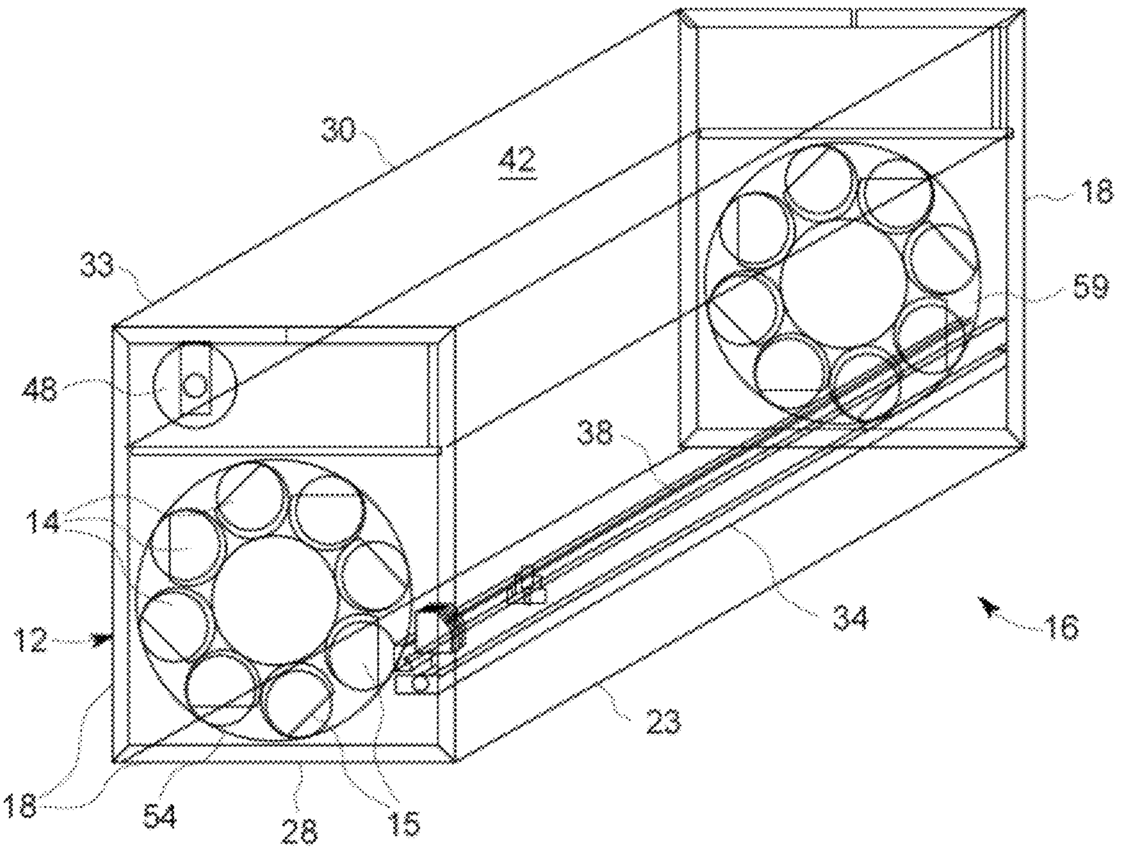
FIG. 4 is a transparent perspective view of a wrapping paper storage and dispensing device in accordance with principles of the invention.
Figure 5:
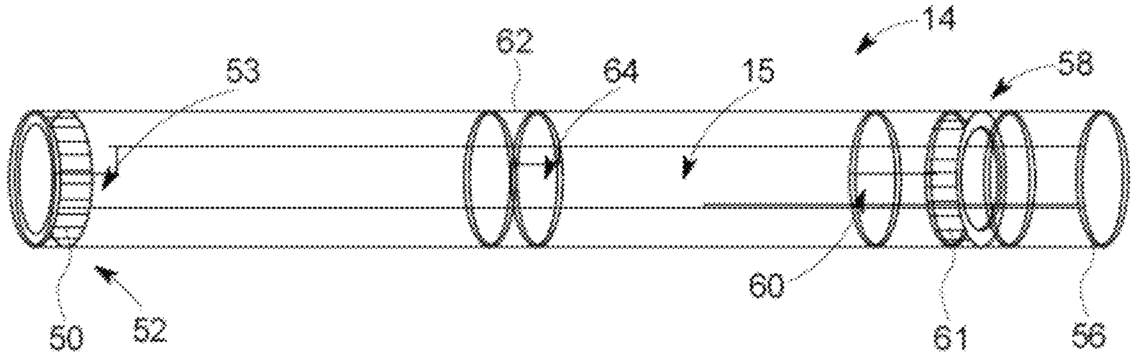
FIG. 5 is a perspective view of a tubular canister for a wrapping paper storage dispensing device in accordance with principles of the invention.
Figure 6:
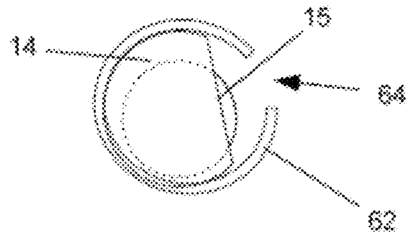
FIG. 6 is a cross-sectional view of a tubular canister for a wrapping paper storage and dispensing device in accordance with principles of the invention.
Figure 7:
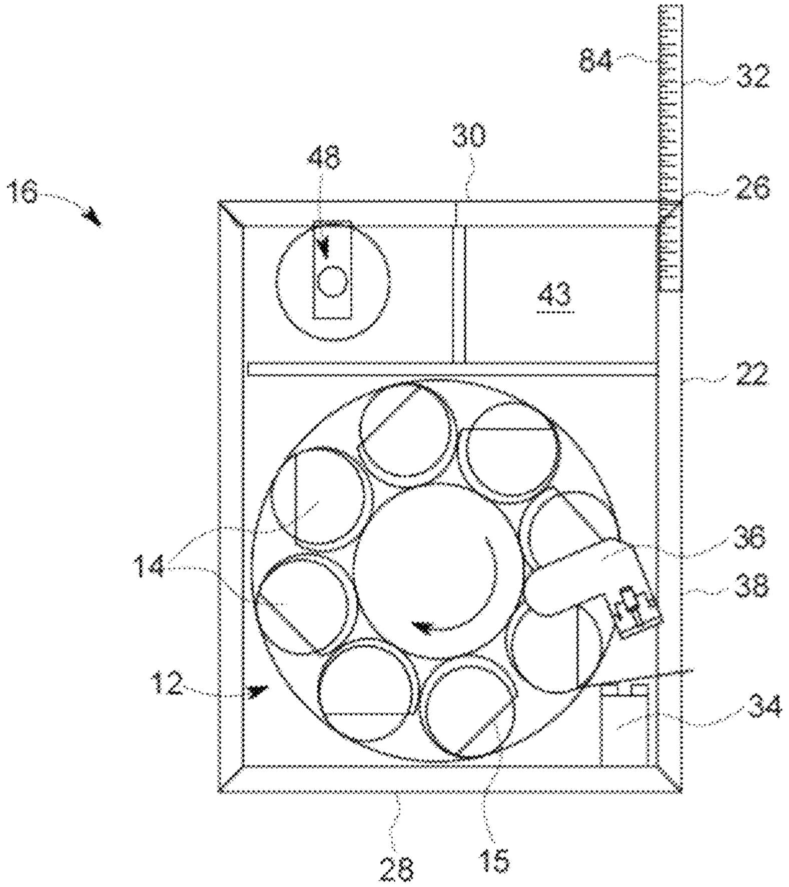
FIG. 7 is a side cross-sectional view of a wrapping paper storage and dispensing device in accordance with principles of the invention.
Figure 8:
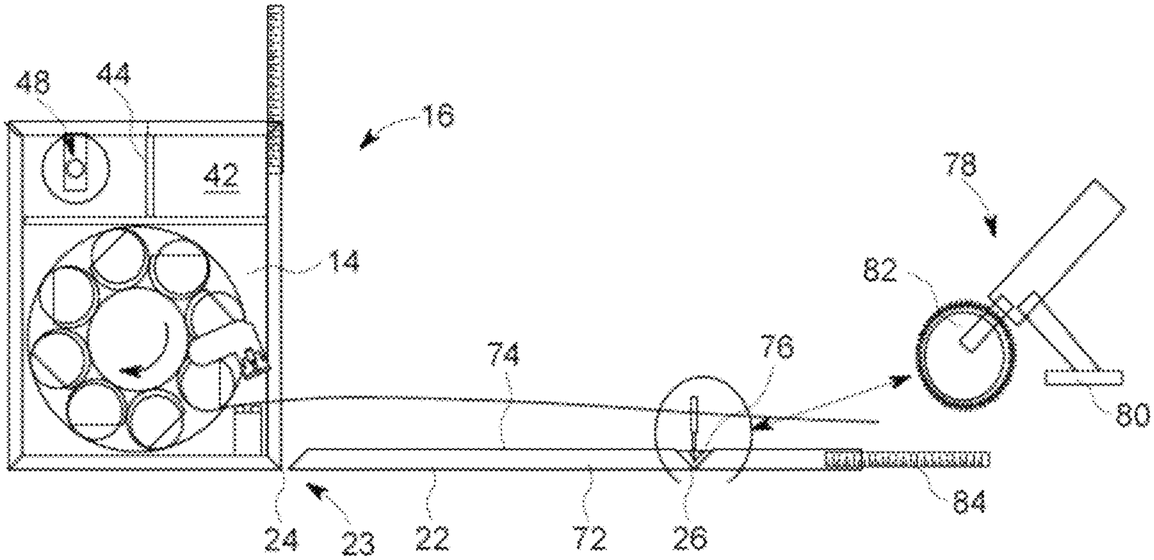
FIG. 8 is another side cross-sectional view of a wrapping paper storage and dispensing device in accordance with principles of the invention.

As may be best seen in FIG. 3, but also in FIGS. 4, 7 and 8, the housing 16 includes an upper compartment 42 that may be further subdivided into additional compartments by dividers 44. A top panel 46 may be hinged along the top rear longitudinal corner 33 of the housing 16 so that it may be opened to expose the compartment 42. The compartment 42 may optionally include an integrated adhesive tape spool 48, as shown in FIGS. 4, 7 and 8. Sub-compartments 43 defined by the dividers 44 may optionally be designated for various items commonly used in giftwrapping, such as for example ribbons, bows, and tags or stickers for identifying the giver and/or receiver of a gift.

In this embodiment, the rotatable drum 12 is formed from eight cylindrically arranged coextensive tubular canisters 14. Optionally, the rotatable drum 12 may include only two or three canisters, or may include many more, for example twelve or sixteen canisters. Each of the tubular canisters 14 has a rectangular opening 15 extending its entire longitudinal length. Because the housing 16 is rectangular and the drum 12 is cylindrical, there is extra space within the housing 16 along its longitudinal corners. The space may optionally be used to store smaller portions of wrapping paper left over from cutting dispensed paper to fit around a gift package.

A first end cap 50 secures the first end 52 of the canister 14 to a first end 54 of the drum 12. The first end cap 50 may include an at least partially resilient circular pad inside the canister 14 which loosely abuts one end of a roll of paper placed within the canister. Optionally, the first end cap 50 may also include a dowel for insertion into the center of a roll of paper. The first end cap 50 may also include a longitudinal slit 53 to more precisely guide paper as it exits the canister 14.

A second end 56 of the canister 14 is secured to a second end 59 of the drum 12. A floating second cap 58 may be slidably adjusted along the longitudinal length of the canister 14 to accommodate rolls of paper of varying length placed within the canister 14. The floating second cap 58 may also include an at least partially resilient circular disc 61 which loosely abuts an opposite end of a roll of paper placed within the canister 14. The floating second cap 58 may also similarly include a longitudinal slit 60 to more precisely guide paper as it exits the canister 14. A sliding tensioner 62 is a C shaped device that fits around the canister 14 and includes a longitudinal slit 64 for more precisely guiding paper as it exits the canister.

In this embodiment, the rectangular longitudinal opening 15 in each of the canisters 14 is a large enough to allow a roll of paper to be inserted into the canister through it. The sliding tensioner 62 (and optionally end caps 50 and 58) may be sufficiently resilient to allow its slit to be widened to allow a paper roll to pass through it. The end cap 58 is then adjusted so that its internal circular disc 60 abuts or is positioned very close to the end of the roll of paper. The sliding tensioner 62 may then be positioned substantially equidistant from the caps 50 and 58. The slits 53, 60 and 64 of the end caps 50, 58 and tensioner 62, respectively, are then aligned longitudinally and paper is drawn through them when dispensed. This allows paper rolls to be easily inserted and removed from the canisters. The guiding slits 53, 60 and 64 guide dispensed paper and reduces wobbling of the paper roll itself about the longitudinal axis 10 as paper is dispensed. The inclusion of the circular disc of the end caps 50 and 58 also assists in keeping the paper roll 17 (shown in FIGS. 6-8) longitudinally aligned with the canister 14. Optionally, the canisters 14 may be provided with narrower openings 15, but this would require paper rolls to be inserted and removed through one of the ends of the canister.

FIG. 8 shows the wrapping paper storage and dispensing device 10 with an additional cutting instrument 78 and an alternative configuration for the secondary hinge 26. In this embodiment, the secondary hinge 26 is positioned on the external side 72 of the front panel 22. The internal side 74 of the hinge 26 forms a V shaped keyway channel 76 when opened. A cutting instrument 78 includes a V-shaped key 80 configured to slide through the keyway channel 76. The cutting instrument 78 includes a circular serrated blade 82 having fine teeth with low pitch angles. In use, paper is pulled out of the dispensing device 10 and laid across the keyway channel 76. The cutting instrument 78 and engages the keyway channel 76 and cuts the paper as it slides along the keyway. The low pitch fine serrated teeth of the blade 82 minimizes tearing of the paper as it cuts. Also shown is an optional measuring stick 84 that may be extended from the first or second panels.

Figure 9:
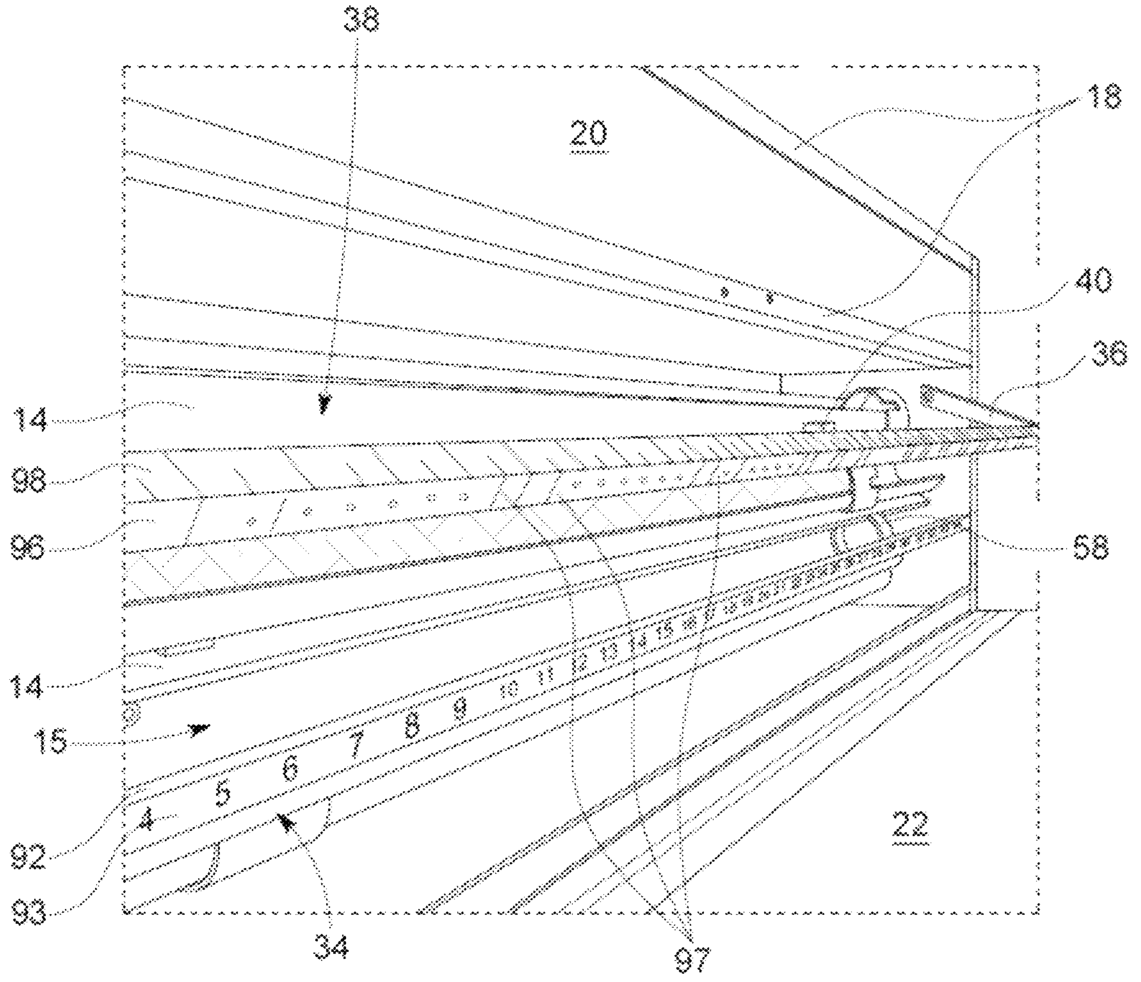
FIG. 9 is a front perspective view of a wrapping paper storage and dispensing device in accordance with principles of the invention.

FIG. 9 shows the cutting base 34 and pivoting arms 36 which support the blade track 38 in more detail. The cutting base 34 is an elongate, rigid beam extending along the longitudinal length of the housing 16. In this embodiment, the cutting base 34 is a metal graduated beam. Optionally, the base 34 itself may extend less than the total longitudinal length of the housing 16 but is preferably at least coextensive with the tubular canisters 14. The planar top 92 of the cutting base 34 has a plurality of evenly spaced transverse slits aligned with corresponding graduated demarcations on its planar front face 93. The pivoting arms 36 support the blade track 38 and are pivotally attached to the housing 16. The blade track 38 includes a planar bottom surface 96 which lies flush with the planar top 92 of the cutting base 34 when the pivoting arms 36 are translated into the down, or closed, position. The blade track 38 has a plurality of evenly spaced transverse slits 97 aligned with corresponding graduated demarcations on its planar front face 98. The transverse slits 97 of the blade track 38 correspond to the transverse slits on the cutting base 34.

When the pivoting arms 36 are translated into an up, or open, position, the distance between the cutting base 34 and the blade track 38 is sufficient to permit an operator to reach into the housing 16 and pull wrapping paper out of one of the tubular canisters 14. Once the distal end of dispensed wrapping paper extends beyond the cutting base 34, the pivoting arms 36 are lowered into the down/closed position, thereby sandwiching the wrapping paper between the cutting base 34 and the blade track 38. The blade carriage 40 may then be slid along the blade track 38 to a desired location and an internal blade in the carriage 40 is slid into the slits 97 and through the corresponding slits in the cutting base 34. The operator then continues to pull the wrapping paper out of the dispensing device until a desired length of wrapping paper has been dispensed. The blade in the carriage 40 must be engaged to provide a smooth straight cut in the paper as it is pulled out of the dispensing device 10. The cutting base 34 and/or the blade track 38 may optionally include a measuring wheel or other counting mechanism that measures the total length of wrapping paper dispensed between the cutting base 34 and the blade track 38.

Figure 10:
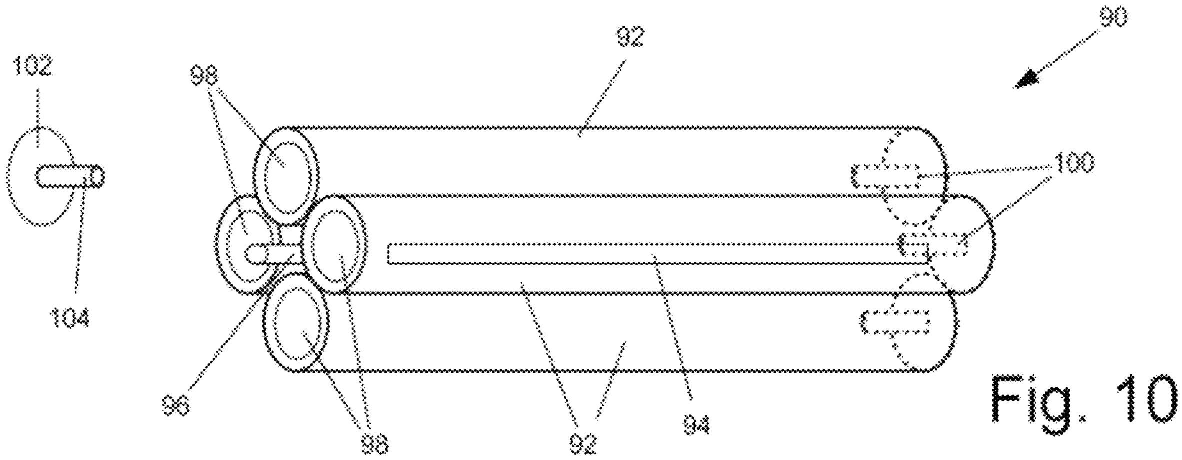
FIG. 10 is a perspective view of an alternative embodiment of a drum of tubular canisters for a wrapping paper storage and dispensing device in accordance with principles of the invention.

FIG. 10 shows an alternative embodiment of a drum 90 in accordance with principles of the invention. The drum 90 is formed from only four tubular canisters 92. Each of the canisters 92 has a relatively narrow opening 94 extending longitudinally along the exterior side of the canister 92. The tubular canisters 92 are connected to a central spine rod 96, which is rotatably connected to the housing, not shown. The tubular canisters 92 also include openings 98 at one end that allow a roll of paper to be inserted and removed. The internal distal ends of the tubular canisters 92 have a dowel 100 over which a roll of paper may be placed. Each of the canisters 92 may also include a proximal end cap 102, which may optionally include a dowel 104 for aligning a roll of wrapping paper.

FIGS. 11-16 show an alternative embodiment of a blade track 110 and a cutting base 112. The cutting base 112 has a longitudinal channel 114. The blade track 110 is formed from first and second components 116 in 118 which also form a longitudinal channel parallel 120 to the longitudinal channel 114 and the cutting base 112. The second component 118 of the blade track 110 include a series of transverse channels 122 which intersect the blade track's longitudinal channel 120. Pivoting arms 124, shown in FIG. 13, pivotally connect the blade track 110 to a housing as shown in previous figures. A counter 126 is positioned at one end of the blade track 110. In this embodiment, the counter 126 includes a trundle wheel 128 opposite to a complementary roller 130 in the cutting base 112, as shown in FIG. 14.

This embodiment of a blade track 110 includes two blade carriages 132 slidably engaged to the top of the blade track 110. A blade 134 extending downward from a rotating push knob 136 is housed within each carriage 132. To slide the carriage 132, the rotating push knob 136 is pulled upward so that the blade 134 disengages with the longitudinal channel 120 and/or the transverse channels 122. The carriage 132 may then be slid along the track 110. To cut paper as it is being dispensed from the device, the push knob 136 is rotated so that the blade 134 aligns with one of the transverse channels 122. The knob 136 is then depressed, dropping the blade 134 into a desired transverse channel 122. The blade 134 and transverse channels 122 thereby function as a locking mechanism. As paper is withdrawn from the dispenser, the blade 134 provides a straight transverse cut. Because the paper is sandwiched between the cutting base 112 and the blade track 110, the cut formed is smooth and straight, without producing unwanted tears in the paper. When a desired amount of paper has been dispensed, which may be measured using the counter 126, the knob 136 may be lifted, rotated 90° and then depressed to position the blade 134 in the longitudinal channel 120. The carriage 132 may then be slid along the blade track 110 to form a longitudinal cut in the paper and separated from the roll.

FIGS. 17-40 show an alternative embodiment of a rolled paper storage and dispensing device 150 in accordance with the principles of the invention. The storage and dispensing device 150 is encased within a housing 152.

FIGS. 17-22 show the various components of the housing 152. In this embodiment, housing 152 is formed from two lateral ends 154 joined at their corners by four longitudinal beams 156 wrapped in a single, unitary semi-flexible web material 157 divided into a back top lid 158, a back panel 160, a base panel 162, a front panel 164 and a front top lid 168 which are all serially connected to one another along longitudinal edges defined by the longitudinal beams 156. In this embodiment, the edges and beams are substantially parallel to a longitudinal axis 171, and the lateral ends 154 are substantially perpendicular to the longitudinal axis 171. When the device 150 is closed, a band 189 holds the back top lid 158 and the front top lid 168 closed. The housing 152 has a rectanguloid shape. Those skilled in the art will appreciate that a variety of other shapes are suitable, as described above in the previous embodiment. The use of a single material to form the panels simplifies manufacture of the device, improves its durability and reduces the number of parts required to form the device.

The front panel 164 and the front top lid 168 may be unfolded so that they lie coplanar with and extend from the base panel 162. The front panel 164 and front top lid 168 include linear measurement markings 170 extending transversely at their lateral ends 172 to assist an operator in measuring paper dispensed from the device 150. The lateral ends 154 may also optionally include vertically aligned linear measurement markings 153 extending transversely perpendicular to the measurement markings 170 on the front panel 164. FIG. 19 shows a longitudinal beam 156 having two ends 155 that may be inserted into sockets 190 in the lateral ends 154, shown in FIG. 22 below.

FIG. 20 shows the top frame 174 having two longitudinal lips 176 which wrap around the upper two longitudinal beams 156, and tabs 178 that connect to the lateral ends 154. The top frame 174 has a bottom panel 180 and lateral end walls 181 that together with the lips 174 form a tray which is subdivided by one or more dividers 182 to form a plurality of trays that may be accessed by opening the front top lid 168 and/or the back top lid 158. Bows, tags, labels, tape and other accessories used in giftwrapping and/or packaging may be stored in the top frame 174. In this embodiment, these storage trays are located on the top of the device. Optionally, the trays maybe located elsewhere on or in the device.

The lateral ends 154 are mirror images of each other and are shown in FIGS. 21 and 22. The exterior face 186 of the lateral ends 154 is formed from a rigid material such as plastic, wood, metal and the like. The exterior face 186 also includes a socket 187 for attaching a retaining strap 189 to the housing 152 to secure the front top lid 168 and back top lid 158 and a closed position during storage or transport. The sockets 187 may also serve as handles, allowing the device to be more easily carried. The lateral ends 154 also include linear measurement markings 153 along its periphery on one or more sides. In this embodiment, the linear measurement markings 153 has been applied by attaching a measuring tape using an adhesive.

The interior face 188 of the lateral ends 154, shown in FIG. 22, includes sockets 190 at each corner four connection to the longitudinal beams 156. The interior faces 188 of the lateral ends 154 also include a central socket 192 for the axle 198 of the drum 202 and a front socket 194 for engaging the pivoting support arm 210 connected to the cutting track 208, described in more detail below. The interior face 188 also includes a cutting base connection socket 196 for connection to the longitudinal cutting base 204 described below. In this embodiment, to simplify manufacturing, the interior faces 188 include an alternate front socket 195 and alternate cutting base connection socket 197, so that the lateral ends are reversible and interchangeable.

Figure 23:
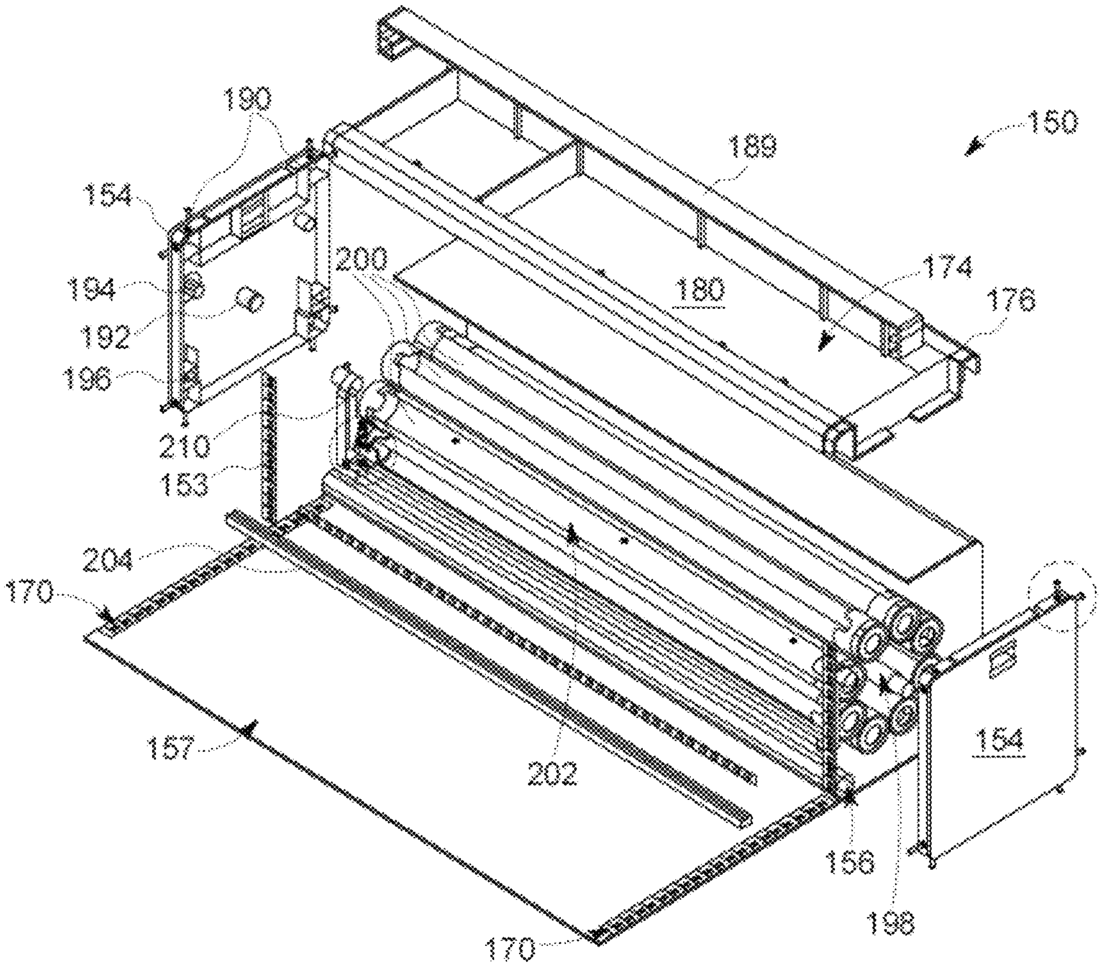
FIG. 23 is an exploded view of an alternative embodiment for a wrapping paper storage and dispensing device in accordance with principles of the invention.

FIG. 23 shows the storing and dispensing device 150 in an exploded view, showing the arrangement of the various components relative to each other. The axle 198 connects to the two sockets 192 on each of the lateral ends 154. Similarly, the four beams 156 at each of the corners of the device 150 connect to each of the lateral ends by inserting the beam ends 155 into the sockets 190. The canisters 200 are radially spaced about the axle 198 and are parallel and coextensive to each other. The canisters 200 collectively form the drama 202 and are connected to each other and the axle 198 by a drum frame 310 shown in FIGS. 39 and 40.

The longitudinal cutting base 204 extends the entire longitudinal length of the device 150 and connects to the sockets 196 in the lateral ends 154.

Figure 24:
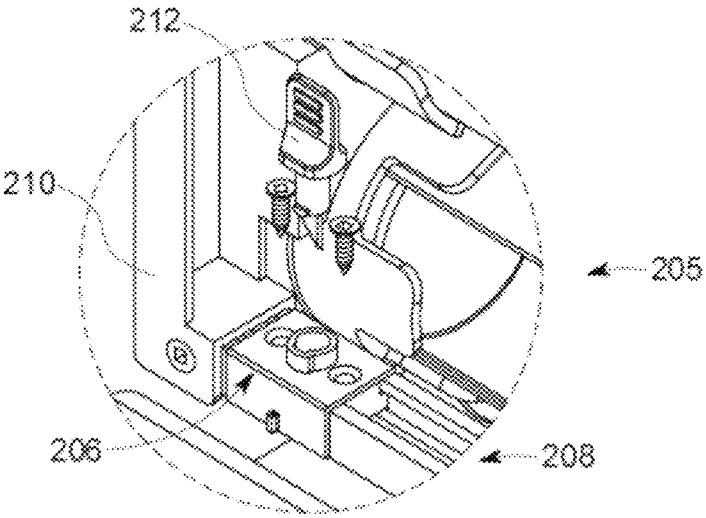
FIG. 24 is a perspective view of a slide cutter for a wrapping paper storage and dispensing device in accordance with principles of the invention.
Figure 25:
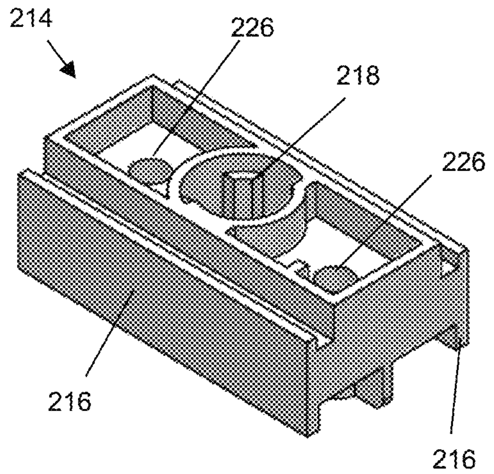
FIG. 25 is a perspective view of a chassis for a blade carriage for a wrapping paper storage and dispensing device in accordance with principles of the invention.
Figure 26:
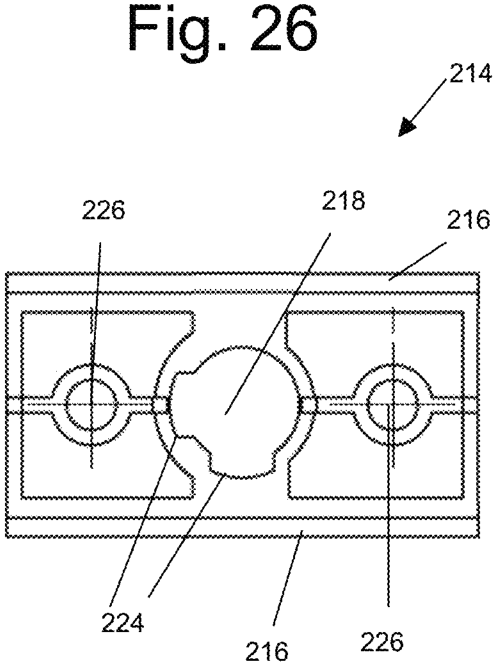
FIG. 26 is a top plan view of a chassis for a blade carriage for a wrapping paper storage and dispensing device in accordance with principles of the invention.

FIG. 24 shows a longitudinal sliding cutter 205. The sliding cutter 205 has a blade carriage 206 sliding when he engaged to a cutting track 208, which is connected to two pivoting support arms 210 at each of its lateral ends. The blade carriage 206 has a blade 212 that may be positioned in either a longitudinal or transverse cutting direction. The cutting track 208 may optionally include linear measurement markings in a longitudinal direction. In this embodiment, the blade 212 is removable from the carriage 206. Optionally, the blade 212 may be retractable rather than completely removable.

FIGS. 25-31 shows the components of the blade carriage 206. The carriage 206 includes a chassis 214 shown in FIGS. 25 and 26. The chassis 206 includes two opposing T-shaped tongues 216 for engaging the cutting track 208, and a vertical central bore 218 through which the blade 212 is inserted. The central bore 218 includes two grooves 224 aligning the blade 212 in a desired direction. Two bolt holes 226 allows the carriage 206 to be removably attached to the chassis cover 230.

Figure 27:
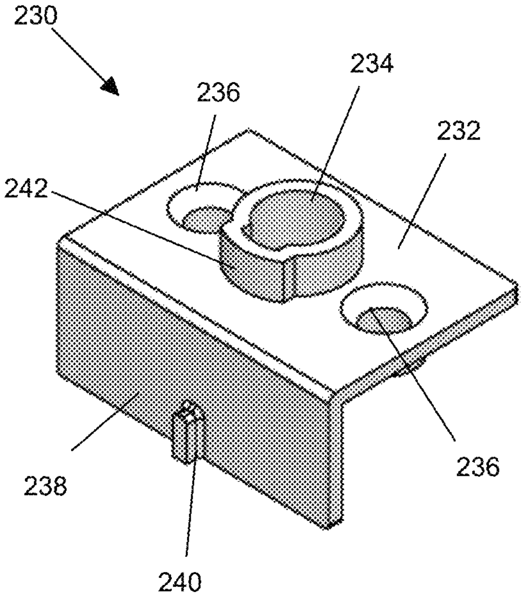
FIG. 27 is a perspective view of a top cover for a blade carriage for a wrapping paper storage and dispensing device in accordance with principles of the invention.
Figure 28:
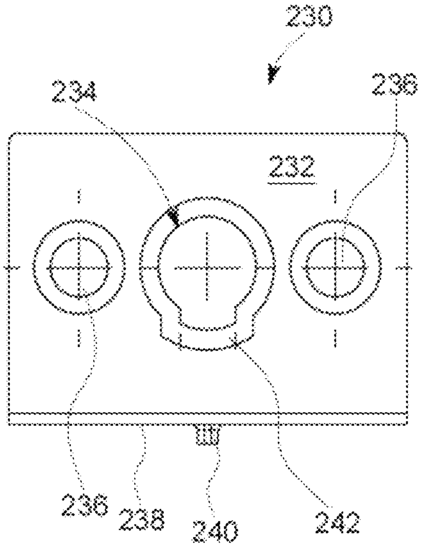
FIG. 28 is a top plan view of a top cover for a blade carriage for a wrapping paper storage and dispensing device in accordance with principles of the invention.

The chassis cover 230, shown in FIGS. 27 and 28 includes a top panel 232 having a bore 234 aligned with the bore 218 of the chassis and two bolt holes 236 that align with the bolt holes 226 of the chassis. The chassis cover 230 also includes a downwardly extending skirt 238 with an alignment fin 240 that indicates the precise location of the edge of the blade 212 on paper being cut. The chassis cover 230 also includes only a single groove 242.

Figure 29:
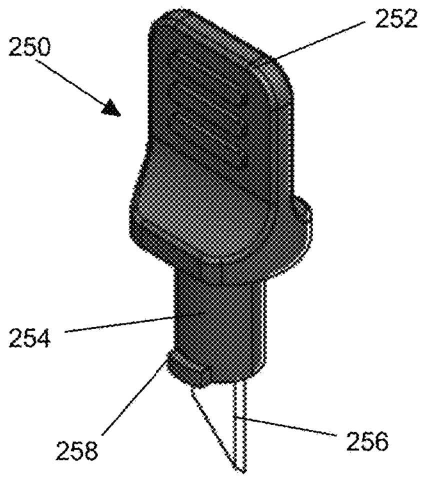
FIG. 29 is a perspective view of a blade for a blade carriage for a wrapping paper storage and dispensing device in accordance with principles of the invention.
Figure 30:
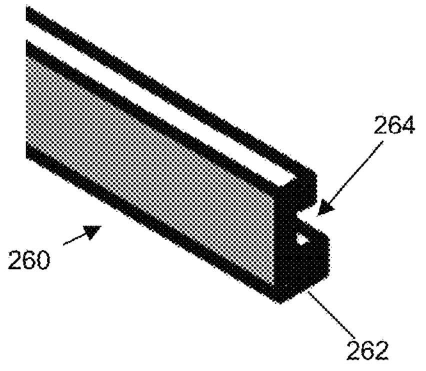
FIG. 30 is a perspective view of a longitudinal rail for a wrapping paper storage and dispensing device in accordance with principles of the invention.
Figure 31:
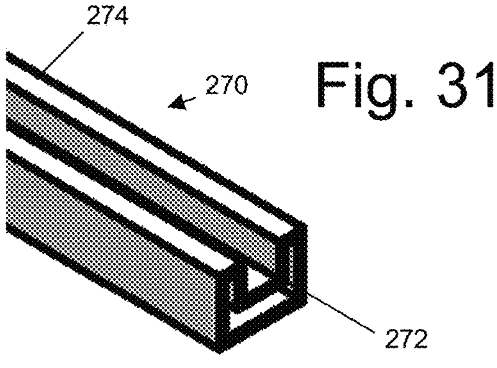
FIG. 31 is a perspective view of a cutting base for a wrapping paper storage and dispensing device in accordance with principles of the invention.

FIG. 29 shows a blade 250 for use with the blade carriage 206. The blade 250 has a handle 252 at the top of a shaft 254, a cutting surface 256 extending downward from the shaft, and a key 258 on one side of the bottom of the shaft. FIG. 30 shows a longitudinal rail 260 that forms one half of the cutting track 208. The rail 260 has a flat, planar bottom surface 262 and a T-shaped groove 264. FIG. 31 shows a cutting base 270 which has a central longitudinal channel 272 extending longitudinally through the flat, planar upper surface 274.

Figure 32:
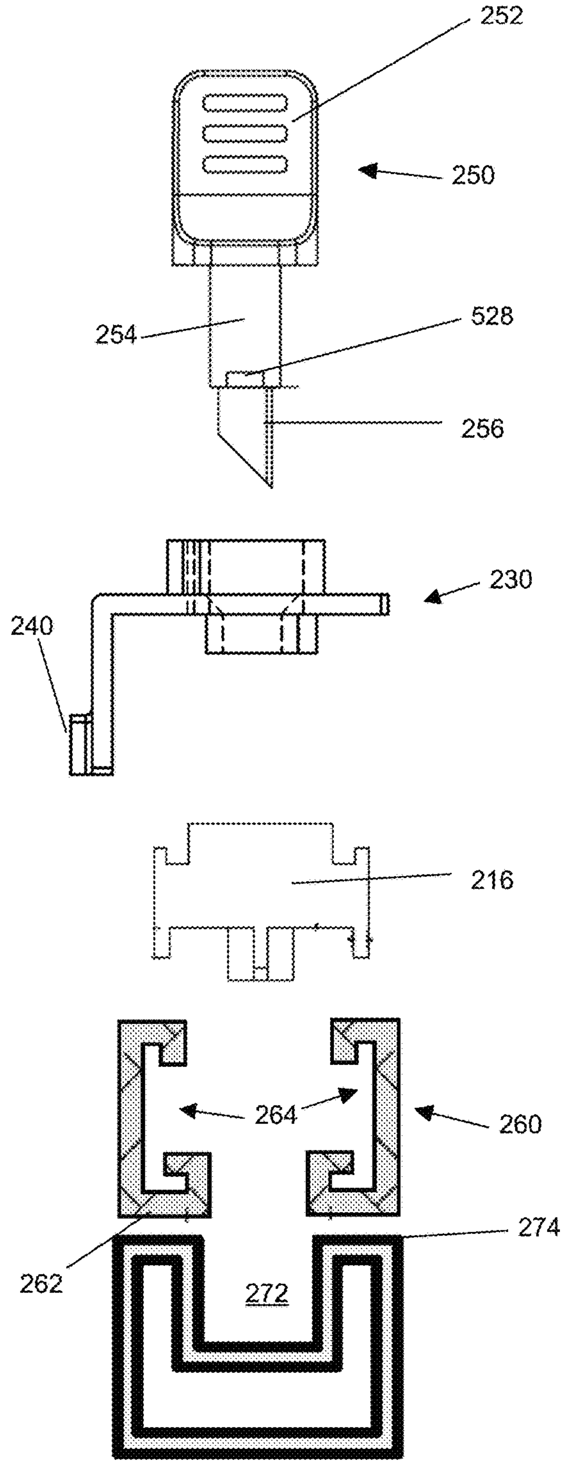
FIG. 32 is an exploded view of a slide cutter for a wrapping paper storage and dispensing device in accordance with principles of the invention.

FIG. 32 shows an exploded view of the components of the longitudinal slide cutter 205. The slide cutter 205 has two opposing longitudinal rails 260 which form the cutting track 208. The T-shaped tongues 216 are inserted into the T-shaped grooves 264 of the longitudinal rails 260. The cover 230 is affixed to the top 278 of the chassis with the skirt 238 draping over one of the sides of the longitudinal rails 260. The blade 212 is inserted through the bores 218 and 234 and twisted to lock it in place. When the cutting track 208 and the cutting base 270 are aligned, the cutting surface 256 of the blade 212 extends into the longitudinal channel 272. The longitudinal rails 260 and the cutting base 270 are configured to lie flush against each other such that any paper extending between them is pressed and held firmly in place by pressing the rails 260 and the base 270 together.

FIGS. 33 and 34 show the pivoting support arms 210. Each includes an elongate body 280 extending from a connecting bracket 282 to a cylindrical axis 284 and includes a handle 286. The longitudinal rails 260 are inserted into an attached to the connecting bracket 282. The pivot arms 210 rotate about their axes 284 to translate the track 208 between them up position away from the cutting base 270 and a down position with the bottoms of the track flush against the top of the base 270.

Figure 36:
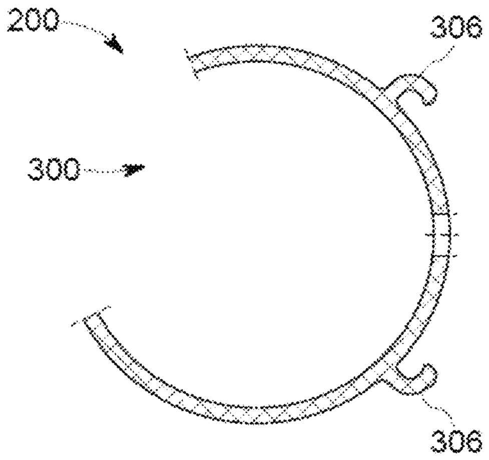
FIG. 36 is a cross-sectional view of a canister for a wrapping paper storage and dispensing device in accordance with principles of the invention.
Figure 37:
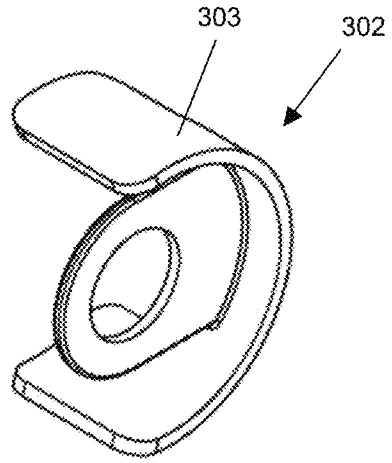
FIG. 37 is a perspective view of an end cap a canister for a wrapping paper storage and dispensing device in accordance with principles of the invention.

FIGS. 35 and 36 show a cylindrical canister 200. The canister 200 is cylindrical and has an opening 300 extending longitudinally along one side. A retainer 302 and an end cap 304 are attached to each end. Paper may be inserted into the canister either through the longitudinal opening 300 or by removing a retainer 302, shown in FIG. 37, and the end cap 304 and inserting a roll of paper through the end. The retainer 302 has a curved outer wall 303 which extends partially, but not completely, around canister 200, so as to prevent the retainer 302 from blocking the opening 300. The canister 200 also includes two lips 306 which form a curved groove for connecting to the drum frame 310. The retainers 302 may optionally include a longitudinal slit 303 as described in the previous embodiment. The retainer described in the previous embodiment may also similarly be used with canisters 200 of this embodiment.

Figure 38:
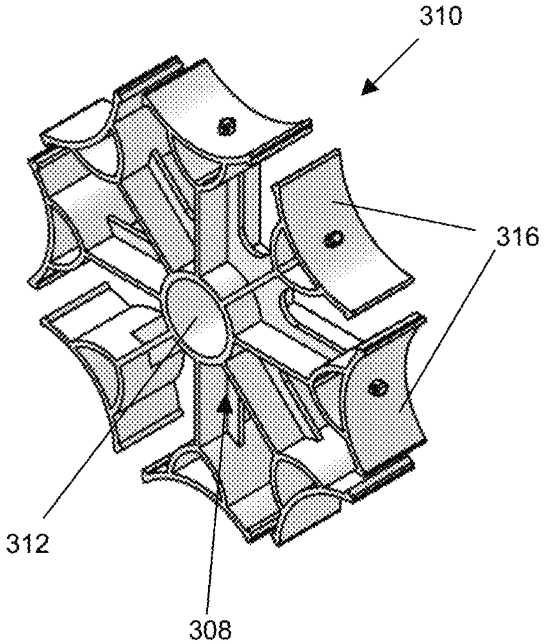
FIG. 38 is a perspective view of a drum frame for a wrapping paper storage and dispensing device in accordance with principles of the invention.
Figure 39:
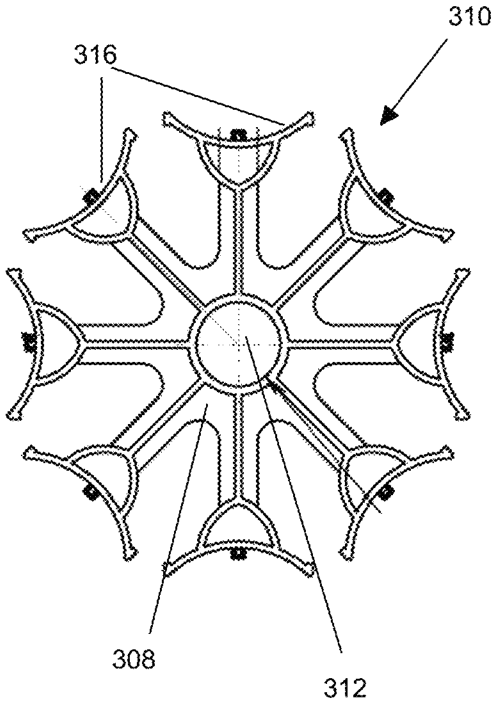
FIG. 39 is a side elevation view of a drum frame for a wrapping paper storage and dispensing device in accordance with principles of the invention.

FIGS. 38 and 39 show a drum frame 310. The axle 198 of the drum 202 extends through the central opening 312 in the hub 308 of the frame 310. A plurality of spokes 314 extend radially outward from the hub 308 to curved tongues 316 complementary to the curved groove formed by the two lips 306 of the canisters 200.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A rolled paper storage and dispensing device comprising:

a housing formed by a base, a front side, a top and a back side, all extending between two lateral ends;

a revolving drum formed by a plurality of radially spaced canisters, wherein the revolving drum is rotatable about a longitudinal axis extending between the ends of the housing; and, a longitudinal slide cutter extending longitudinally across the front side between the two ends of the housing;

wherein each of the plurality of radially spaced canisters comprises:

a cylindrical tube having a rectangular opening extending along a longitudinal length of the tube, wherein the rectangular opening has a width sized to allow a rolled sheet of paper to be inserted through the opening into the cannister;

a stationary first end cap extending partially over a first end of the cylindrical tube and having a longitudinal guiding slit with a width that is less than the width of the rectangular opening; and, a sliding second end cap on a second end of the cylindrical tube and slidable along the length of the tube, the sliding second end cap having a guiding slit with a width that is less than the width of the rectangular opening.

2. The rolled paper storage dispensing device of claim 1 wherein the longitudinal slide cutter comprises:

a cutting base having a central longitudinal channel in a planar top surface;

a cutting track formed by two opposing longitudinal rails, wherein each of the rails has a planar bottom surface;

a blade carriage slidingly engaged to cutting track, and having a handle extending upward from the track and a blade extending downward through the from the track; and, two rotating support arms, each attaching an end of the cutting track to an end of the housing;

wherein the rotating support arms allow the cutting track to translate between an open position where the cutting track is rotated away from the cutting base, and a closed cutting position where the track's planar bottom surface lies flush against the planar top surface of the cutting base and the blade extends into the longitudinal slot in the planar top surface of the base.

3. The roller paper storage dispensing device of claim 2 further comprising a removable, elongate C-shaped retainer extending around the cylindrical tube and slidably engaged to the canister between the first end cap and the second end cap.

4. The rolled paper storage dispensing device of claim 3 wherein the first end cap and the second end cap each include a longitudinal slit and an internal pad which abuts the end of a rolled sheet of paper inserted into the canister.

5. The rolled paper storage dispensing device of claim 2 wherein the blade of the blade carriage extends downward from a rotating push knob, wherein the blade disengages the channel of the cutting base when the push knob is moved upward and the blade extends into the channel when the push knob is depressed.

6. The rolled paper storage dispensing device of claim 5 wherein the cutting track includes longitudinally arranged serial measurement markings on a top surface.

7. The rolled paper storage dispensing device of claim 6 wherein the base further comprises a plurality of transverse slots extending from and perpendicular to the longitudinal slot in the top surface of the cutting base;

wherein the transverse slots of the cutting base are aligned with the serial measurement markings on the guide track; and wherein the blade of the carriage may be rotated 90 degrees by rotating the rotating push knob and extended into the transverse slots of the base.

8. The rolled paper storage dispensing device of claim 7 wherein the revolving drum comprises two disks each rotatably attached to one of the two ends of the housing, and wherein the ends of the cannisters are affixed a peripheral region of the disks.

9. The rolled paper storage dispensing device of claim 7 wherein the revolving drum comprises two or more wheels, wherein the wheels are each comprised of a plurality of spokes extending radially from a hub, the hub being rotatably affixed to an axle, and the cannisters being removably affixed to the ends of the spokes.

* * * * *